(12) United States Patent
Suzuki

(10) Patent No.: US 6,788,890 B2
(45) Date of Patent: Sep. 7, 2004

(54) SWITCHING MECHANISM OF A LENS BARREL FOR SWITCHING BETWEEN AUTOMATIC AND MANUAL FOCUSING MODES

(75) Inventor: Hiroaki Suzuki, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/684,411

(22) Filed: Oct. 15, 2003

(65) Prior Publication Data

US 2004/0081442 A1 Apr. 29, 2004

(30) Foreign Application Priority Data

Oct. 17, 2002 (JP) ........................................ 2002-302679

(51) Int. Cl.[7] .............................. G03B 3/00; G02B 7/02
(52) U.S. Cl. ...................................... 396/137; 359/825
(58) Field of Search .................... 396/137; 359/823–825

(56) References Cited

U.S. PATENT DOCUMENTS

| 4,110,769 A | * | 8/1978 | Schutz et al. ............... 396/85 |
| 5,239,417 A | | 8/1993 | Eguchi et al. .............. 359/823 |
| 5,918,078 A | * | 6/1999 | Imura et al. ................ 396/137 |
| 5,969,889 A | * | 10/1999 | Iikawa et al. ............... 359/825 |
| 6,025,964 A | * | 2/2000 | Yamamoto .................. 359/824 |

FOREIGN PATENT DOCUMENTS

JP        5-34568        2/1993        ............ G02B/7/09

* cited by examiner

*Primary Examiner*—W. B. Perkey
(74) *Attorney, Agent, or Firm*—Greenblum & Bernstein, P.L.C.

(57) ABSTRACT

A switching mechanism of a lens barrel includes a stationary barrel having a stop groove; a lens holding ring, a distance adjustment ring and an AF/MF switching ring, each positioned concentrically with the stationary barrel. The AF/MF switching ring is prevented from rotating relative to the stationary barrel by engagement of the engaging member with the stop groove while a driving force is transferred from a power source to the distance adjustment ring to move the lens holding ring along the optical axis when the AF/MF switching ring is in the AF position. Rotation of the AF/MF switching ring is transferred to the distance adjustment ring to move the lens holding ring along the optical axis while the driving force is prevented from being transferred from the power source to the distance adjustment ring when the AF/MF switching ring is in the MF position.

11 Claims, 9 Drawing Sheets

SWITCHING MECHANISM OF A LENS BARREL FOR SWITCHING BETWEEN AUTOMATIC AND MANUAL FOCUSING MODES

BACKGROUND OF THE INVENTION

1. Field of the Invention

The present invention relates to a lens barrel which can be used as a photographing lens of an AF camera, and more specifically, to a switching mechanism of such a lens barrel for switching between automatic focusing and manual focusing.

2. Description of the Related Art

FIGS. 8 through 11 show a conventional interchangeable lens barrel having a switching mechanism between an automatic focusing mode and a manual focusing mode. The lens barrel 01 includes a stationary barrel 03 having a small-diameter ring portion 07 and a large-diameter ring portion 05 positioned radially outside the small-diameter ring portion 07. A distance adjustment ring 09 is positioned between the small-diameter ring portion 07 and the large-diameter ring portion 05 to be freely rotatable about an optical axis O. An AF/MF switching ring 011 for switching between an automatic focusing mode and a manual focusing mode is fitted on the large-diameter ring portion 05. The AF/MF switching ring 011 is freely rotatable about the optical axis O and movable along the optical axis O relative to the large-diameter ring portion 05 between an AF position and an MF position to switch between an automatic focusing mode and a manual focusing mode, respectively. A lens holding ring 013 for holding a focusing lens group L is screw-engaged with the small-diameter ring portion 07. A rotation of the distance adjustment ring 09 causes the lens holding ring 013 to move along the optical axis O while rotating about the optical axis O. The lens barrel 01 is provided between the large-diameter ring portion 05 and the small-diameter ring portion 07 with an AF drive mechanism 015 which transfers a rotation of an AF motor (provided in a camera body (not shown) to which the lens barrel 01 is mounted) to the distance adjustment ring 09 to perform an autofocusing operation when the AF/MF switching ring 011 is in the AF position (automatic focusing mode). When the AF/MF switching ring 011 is in the MF position (manual focusing mode), the AF drive mechanism 015 is disengaged from the distance adjustment ring 09.

The large-diameter ring portion 05 is provided, on an outer peripheral surface thereof at the front end of the large-diameter ring portion 05, with a plurality of stop grooves 017 which extend in a direction of the optical axis O (i.e., optical axis direction). The plurality of stop grooves 017 are arranged in a circumferential direction of the large-diameter ring portion 05. An AF engaging member 019 is fixed to an inner peripheral surface of the AF/MF switching ring 011. The AF engaging member 019 is engaged with one of the plurality of stop grooves 017 to prevent the AF/MF switching ring 011 from rotating when the AF/MF switching ring 011 is in the AF position (see FIGS. 8 and 10). The distance adjustment ring 09 is provided at the front end thereof with a plurality of engaging grooves 021 which extend in the optical axis direction (see FIG. 11). The plurality of engaging grooves 021 are arranged in a circumferential direction of the distance adjustment ring 09. The AF/MF switching ring 011 is provided at the front end thereof with an inner flange 023. An MF engaging pin 025 projects rearwards from a rear surface of the inner flange 023 to be engaged with any one of the plurality of engaging grooves 021. The MF engaging pin 025 is engaged in one of the plurality of engaging grooves 021 when the AF/MF switching ring 011 is in the MF position to transmit rotation of the AF/MF switching ring 011 to the distance adjustment ring 09.

In the lens barrel 01 having the above described structure, the MF engaging pin 025 is disengaged from the plurality of engaging grooves 021 when the AF/MF switching ring 011 is in the AF position to allow the AF drive mechanism 015 to perform an auto-focusing operation. When the AF/MF switching ring 011 is in the MF position, the MF engaging pin 025 is engaged in one of the plurality of engaging grooves 021 so that a rotation of the AF/MF switching ring 011 is transferred to the distance adjustment ring 09 to perform a focusing operation (manual focusing operation) when the AF/MF switching ring 011 is manually rotated.

Installation of both the AF engaging member 019 and the MF engaging pin 025 at different positions on the AF/MF switching ring 011 increases the cost of production, the cost of assembly and the size of the lens barrel 01.

SUMMARY OF THE INVENTION

The present invention provides a lens barrel having a switching mechanism between an automatic focusing mode and a manual focusing mode, wherein the cost of production and the cost of assembly of the lens barrel can be reduced while further miniaturizing the lens barrel.

According to an aspect of the present invention, a switching mechanism of a lens barrel for switching between an automatic focusing mode and a manual focusing mode, the switching mechanism including a stationary barrel having at least one stop groove; a lens holding ring, positioned concentrically with the stationary barrel, the lens holding ring holding at least one lens group; a distance adjustment ring which is positioned concentrically with the stationary barrel, immovable along an optical axis relative to the stationary barrel, and rotatable about the optical axis relative to the stationary barrel, wherein a rotation of the distance adjustment ring causes the lens holding ring to move along the optical axis, and wherein the distance adjustment ring includes at least one engaging groove; and an AF/MF switching ring which is positioned concentrically with the stationary barrel, movable along the optical axis relative to the stationary barrel, and rotatable about the optical axis relative to the stationary barrel, wherein movement of the AF/MF switching ring relative to the stationary barrel between an AF position and an MF position switches between the automatic focusing mode and the manual focusing mode, respectively, and wherein the AF/MF switching ring includes an engaging member which is selectively engaged with the stop groove and the engaging groove. The AF/MF switching ring is prevented from rotating relative to the stationary barrel by engagement of the engaging member with the stop groove while a driving force is transferred from a power source to the distance adjustment ring to move the lens holding ring along the optical axis when the AF/MF switching ring is in the AF position. A rotation of the AF/MF switching ring is transferred to the distance adjustment ring to move the lens holding ring along the optical axis via engagement of the engaging member with the engaging groove while the driving force is prevented from being transferred from the power source to the distance adjustment ring when the AF/MF switching ring is in the MF position.

It is desirable for the engaging member to include a first engaging portion and a second engaging portion which are fixed at opposite ends of a leaf spring in the optical axis direction to be engageable with the stop groove and the engaging groove, respectively, the leaf spring being elongated in the optical axis direction and a central portion thereof being fixed to said AF/MF switching ring. The leaf spring is resiliently deformed to move the first engaging portion to a non-engaging position thereof, wherein the first engaging portion is disengaged from the stop groove, when the AF/MF switching ring moves from the MF position to the AF position in the case where the first engaging portion is not aligned with the stop groove in the circumferential direction thereof. The leaf spring is resiliently deformed to move the second engaging portion to a non-engaging position thereof wherein the second engaging portion is disengaged from the engaging groove when the AF/MF switching ring moves from the AF position to the MF position in the case where the second engaging portion is not aligned with the engaging groove in the circumferential direction.

In another embodiment, a switching mechanism of a lens barrel for switching between an automatic focusing mode and a manual focusing mode is provided, the switching mechanism including a stationary barrel having at least one stop groove; a lens holding ring holding at least one lens group which functions as a focusing lens, the lens holding ring being movable in an optical axis direction; a distance adjustment ring being relatively rotatable with respect to the stationary barrel so that a rotation of the distance adjustment ring causes the lens holding ring to move along the optical axis, the distance adjustment ring being provided with at least one engaging groove; an AF/MF switching ring being movable between an AF position and an MF position along the optical axis and rotatable relative to the stationary barrel; an AF driving power mechanism which rotates the distance adjustment ring when the AF/MF switching ring is positioned at the AF position in accordance with object distance information; and a first engaging portion and a second engaging portion which are fixed at opposite ends of a leaf spring in the optical axis direction to be engageable with the stop groove and the engaging groove, respectively, the leaf spring being elongated in the optical axis direction and a central portion thereof being fixed to the AF/MF switching ring. The leaf spring is resiliently deformed to move the first engaging portion to a non-engaging position thereof, wherein the first engaging portion is disengaged from the stop groove, when the AF/MF switching ring moves from the MF position to the AF position in the case where the first engaging portion is not aligned with the stop groove in the circumferential direction thereof. The leaf spring is resiliently deformed to move the second engaging portion to a non-engaging position thereof wherein the second engaging portion is disengaged from the engaging groove when the AF/MF switching ring moves from the AF position to the MF position in the case where the second engaging portion is not aligned with the engaging groove in the circumferential direction.

It is desirable for the stop groove of the stationary barrel to include a plurality of stop grooves arranged in a circumferential direction of the stationary barrel.

It is desirable for the engaging groove of the distance adjustment ring to include a plurality of stop grooves arranged in a circumferential direction of the stationary barrel.

It is desirable for the plurality of stop grooves to be arranged at equi-angular intervals.

It is desirable for the plurality of engaging grooves to be arranged at equi-angular intervals.

It is desirable for the AF/MF switching ring to be fitted on the stationary barrel to be manually moved between the AF position and the MF position, and for the AF/MF switching ring to include a recess on an inner peripheral surface thereof, the engaging member being positioned in the recess.

It is desirable for the leaf spring to be resiliently deformed so that the first engaging portion moves radially outwards when the AF/MF switching ring moves from the MF position to the AF position in the case where the first engaging portion is not aligned with the stop groove in the circumferential direction, and for the leaf spring to be resiliently deformed so that the second engaging portion moves radially outwards when the AF/MF switching ring moves from the AF position to the MF position if the second engaging portion is not aligned with the engaging groove in the circumferential direction.

In another embodiment, a switching mechanism of a lens barrel for switching between an automatic focusing mode and a manual focusing mode is provided, the switching mechanism including a stationary ring having a first plurality of engaging grooves arranged at equi-angular intervals about an optical axis; an AF/MF switching ring fitted on the stationary ring to be manually movable along the optical axis relative to the stationary ring between an AF position and an MF position to switch between the automatic focusing mode and the manual focusing mode, respectively; a rotatable ring fitted in the stationary ring to be rotatable about the optical axis without moving along the optical axis relative to the stationary ring, the rotatable ring having a second plurality of engaging grooves arranged at equi-angular intervals about an optical axis; and an engaging member fixed to opposite ends of a leaf spring in the optical axis direction, the leaf spring fixed to the AF/MF switching ring, wherein the engaging member includes a first engaging portion and a second engaging portion of the engaging member are engageable in any one of the first plurality of engaging grooves and any one of the second plurality of engaging grooves, respectively. The first engaging portion of the engaging member is engaged in one of the first plurality of engaging grooves when the AF/MF switching ring moves from the MF position to the AF position in the case where the first engaging portion is aligned with the one first engaging groove in the circumferential direction thereof. The second engaging portion of the engaging member is engaged in one of the second plurality of engaging grooves when the AF/MF switching ring moves from the AF position to the MF position in the case where the second engaging portion is aligned with the one second engaging groove in the circumferential direction thereof. The leaf spring is resiliently deformed so that the first engaging portion moves radially outwards when the AF/MF switching ring moves from the MF position to the AF position in the case where the first engaging portion is not aligned with the one first engaging groove in the circumferential direction, and so that the second engaging portion moves radially outwards when the AF/MF switching ring moves from the AF position to the MF position in the case where the second engaging portion is not aligned with the one second engaging groove in the circumferential direction thereof.

It is desirable for the rotatable ring to be driven to rotate by an AF motor provided in a camera body to which the lens barrel is mounted when the AF/MF switching ring is in the AF position, and a focusing lens group to move along the optical axis by a rotation of the AF/MF switching ring via the rotatable ring when the AF/MF switching ring is in the MF position.

The present disclosure relates to subject matter contained in Japanese Patent Applications No. 2002-302679 (filed on Oct. 17, 2002) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
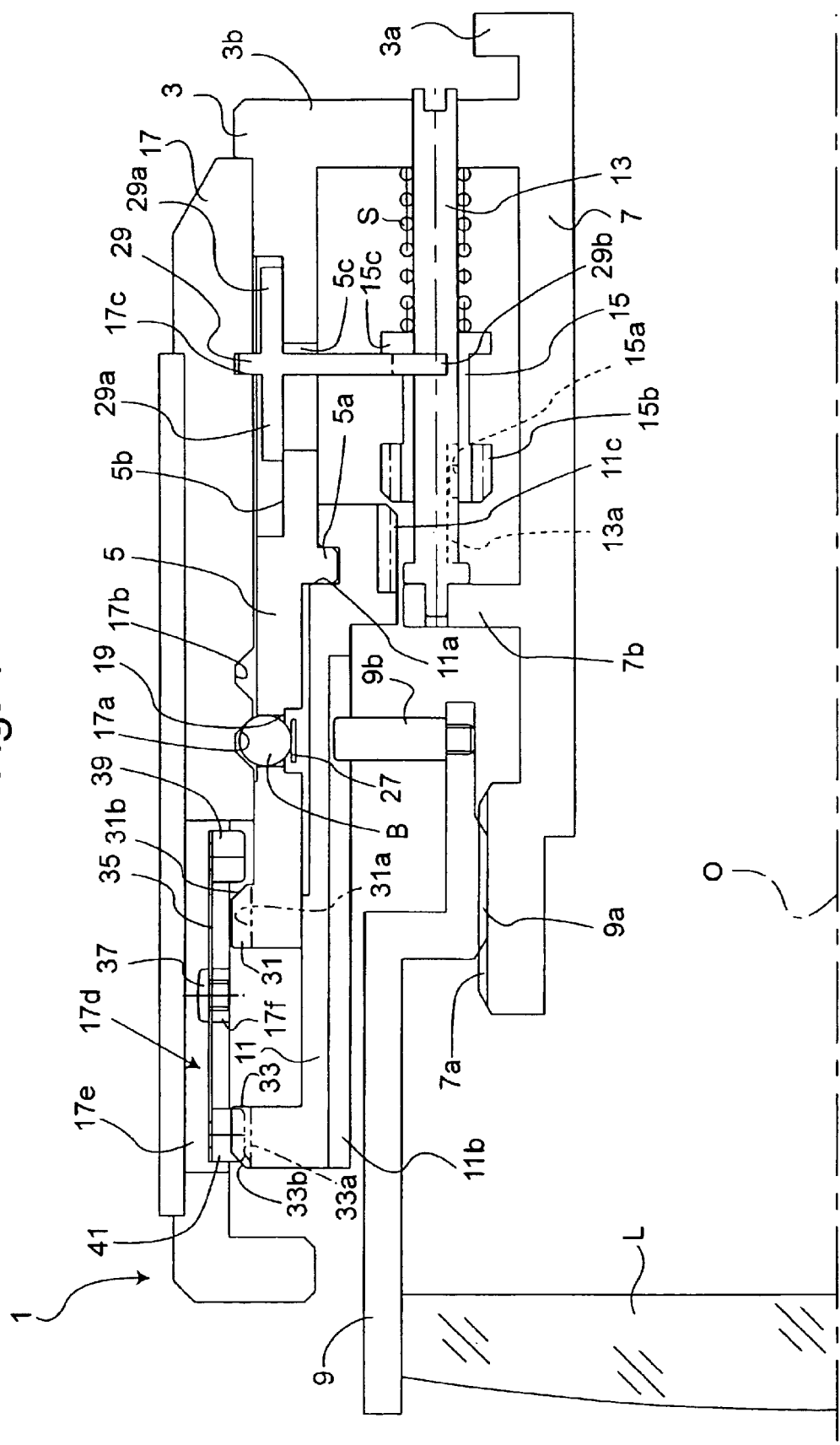
FIG. 1 is a longitudinal cross sectional view of an embodiment of a lens barrel according to the present invention, showing an upper half of the lens barrel from the optical axis when an AF/MF switching ring is in the MF position.

Firstly, the overall structure of an embodiment of a lens barrel shown in FIGS. 1 through 7 will be discussed hereinafter. The lens barrel 1 is an interchangeable lens which is mounted to a camera body of an AF (autofocus) camera system, e.g., an SLR AF camera system. The lens barrel 1 is provided with a stationary barrel 3. The stationary barrel 3 is provided at the rear end thereof with a bayonet mount ring 3a which can be mounted to a corresponding bayonet mount ring on a camera body. The stationary barrel 3 is provided with a large-diameter ring portion 5 and a small-diameter ring portion 7 which are concentrically arranged about an optical axis O. The small-diameter ring portion 7 is provided, on an outer peripheral surface thereof in close vicinity of the front end of the small-diameter ring portion 7, with a male thread portion 7a. The lens barrel 1 is provided between the large-diameter ring portion 5 and the small-diameter ring portion 7 with a focusing ring (lens holding ring) 9. The focusing ring 9 is provided on an inner peripheral surface thereof with a female thread portion 9a which is engaged with the male thread portion 7a of the small-diameter ring portion 7. The focusing ring 9 holds a focusing lens group L, and moves along the optical axis O due to engagement of the male thread portion 7a with the female thread portion 9a when the focusing ring 9 is rotated about the optical axis O.

The lens barrel 1 is provided inside the large-diameter ring portion 5 with a distance adjustment ring 11. The distance adjustment ring 11 is provided at a rear end thereof with a circumferential annular groove 11a. The large-diameter ring portion 5 is provided on an inner peripheral surface thereof with a circumferential annular projection 5a which projects radially inwards to be engaged in the circumferential annular groove 11a of the distance adjustment ring 11. The distance adjustment ring 11 is freely rotatable about the optical axis O without moving along the optical axis O with respect to the large-diameter ring portion 5 due to engagement of the circumferential annular projection 5a with the circumferential annular groove 11a.

The distance adjustment ring 11 is provided on an inner peripheral surface thereof with a set of axial grooves 11b (only one of them appears in FIGS. 1 through 3) which extend parallel to the optical axis O. The focusing ring 9 is provided, on an outer peripheral surface thereof in the vicinity of the rear end of the focusing ring 9, with a corresponding set of drive power transfer pins 9b (only one of them appears in FIGS. 1 through 3) which project radially outwards to be engaged in the set of axial grooves 11b, respectively.

The small-diameter ring portion 7 is provided on an outer peripheral surface thereof with a circumferential annular flange 7b. The lens barrel 1 is provided between the large-diameter ring portion 5 and the small-diameter ring portion 7 with a rotary shaft 13 which extends parallel to the optical axis O. Opposite ends of the rotary shaft 13 are respectively supported by the circumferential annular flange 7b and a rear wall 3b of the stationary barrel 3 to be freely rotatable on the axis of the rotary shaft 13. The rear end of the rotary shaft 13 is coupled to a front end of a rotary output shaft of an AF motor M (FIG. 3) provided in the camera body to which the lens barrel 1 is mounted so that the rotary shaft 13 is driven by the AF motor.

A gear cylinder (pinion gear) 15 is fitted on the rotary shaft 13 to be fixed thereto. More specifically, the rotary shaft 13 is provided on an outer peripheral surface thereof with an axial groove 13a which extends linearly in a direction parallel to the optical axis O while the gear cylinder 15 is provided on an inner peripheral surface thereof with an engaging projection 15a which is slidably engaged in the axial groove 13a of the rotary shaft 13 so that the gear cylinder 15 rotates together with the rotary shaft 13 while being allowed to move linearly in the axial direction of the rotary shaft 13 (i.e., the optical axis direction) within a range of the axial groove 13a with respect to the rotary shaft 13. A gear portion 15b which is formed on an outer peripheral surface of the gear cylinder 15 is engageable with a circumferential gear portion 11c which is formed on an inner peripheral surface of the distance adjustment ring 11 at the rear end thereof. The gear cylinder 15 is provided behind the gear portion 15b with a flange 15c. A compression coil spring S is fitted on the rotary shaft 13 to be positioned between the flange 15c of the gear cylinder 15 and the rear wall 3b of the stationary barrel 3 in a compressed fashion to bias the gear cylinder 15 continuously forward. The AF motor M, the rotary shaft 13, the gear cylinder 15, the gear portion 15b and the circumferential gear portion 11c of the distance adjustment ring 11 constitute an AF driving power mechanism. This AF driving power mechanism rotates the distance ring 11 in accordance with object distance information stored in a memory (not shown).

The lens barrel 1 is provided around the large-diameter ring portion 5 with a hand-operated AF/MF switching ring 17. The AF/MF switching ring 17 is fitted on the large-diameter ring portion 5 to be freely rotatable about the optical axis O, and movable along the optical axis O with respect to the large-diameter ring portion 5. The AF/MF switching ring 17 is provided on an inner peripheral surface thereof with a front circumferential annular groove (MF-position holding groove) 17a and a rear circumferential annular groove (AF-position holding groove) 17b which is positioned behind the front circumferential annular groove 17a in the optical axis direction.

Figure 6:
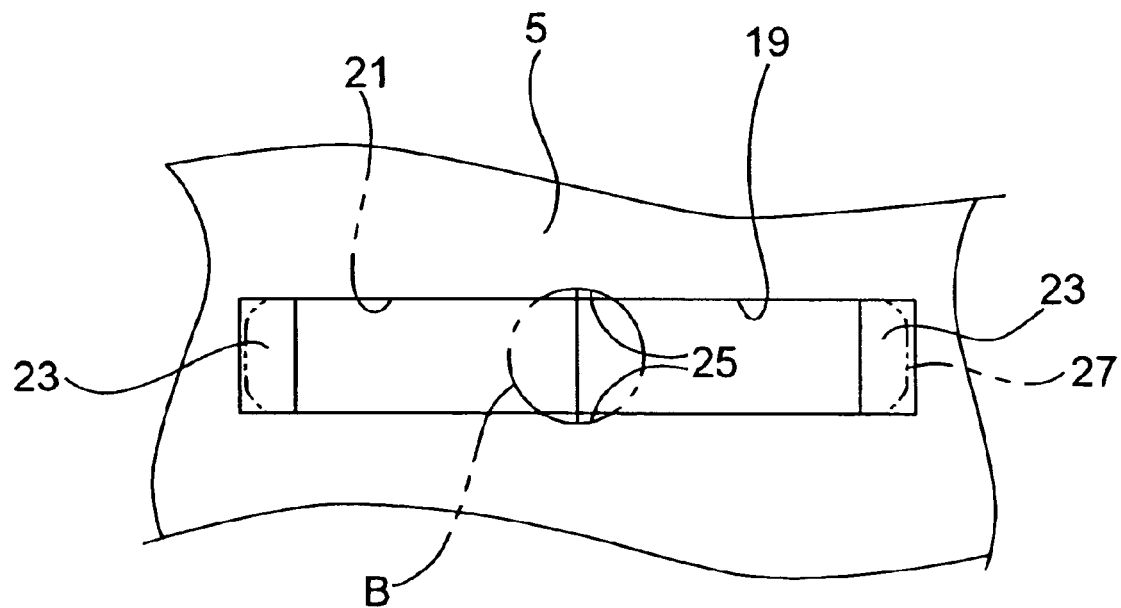
FIG. 6 is a plan view of a click stop mechanism with a stop ball.
Figure 7:
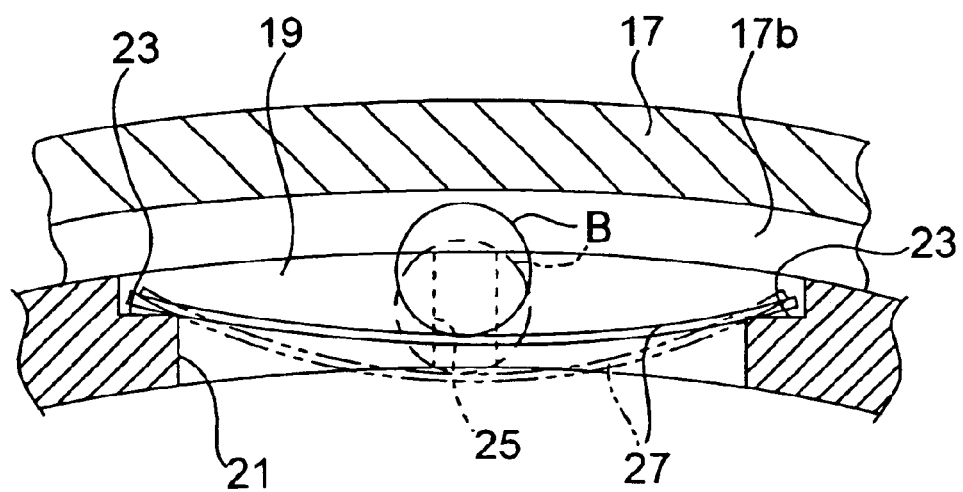
FIG. 7 is a transverse cross sectional view of the click stop mechanism shown in FIG. 6.
Figure 8:
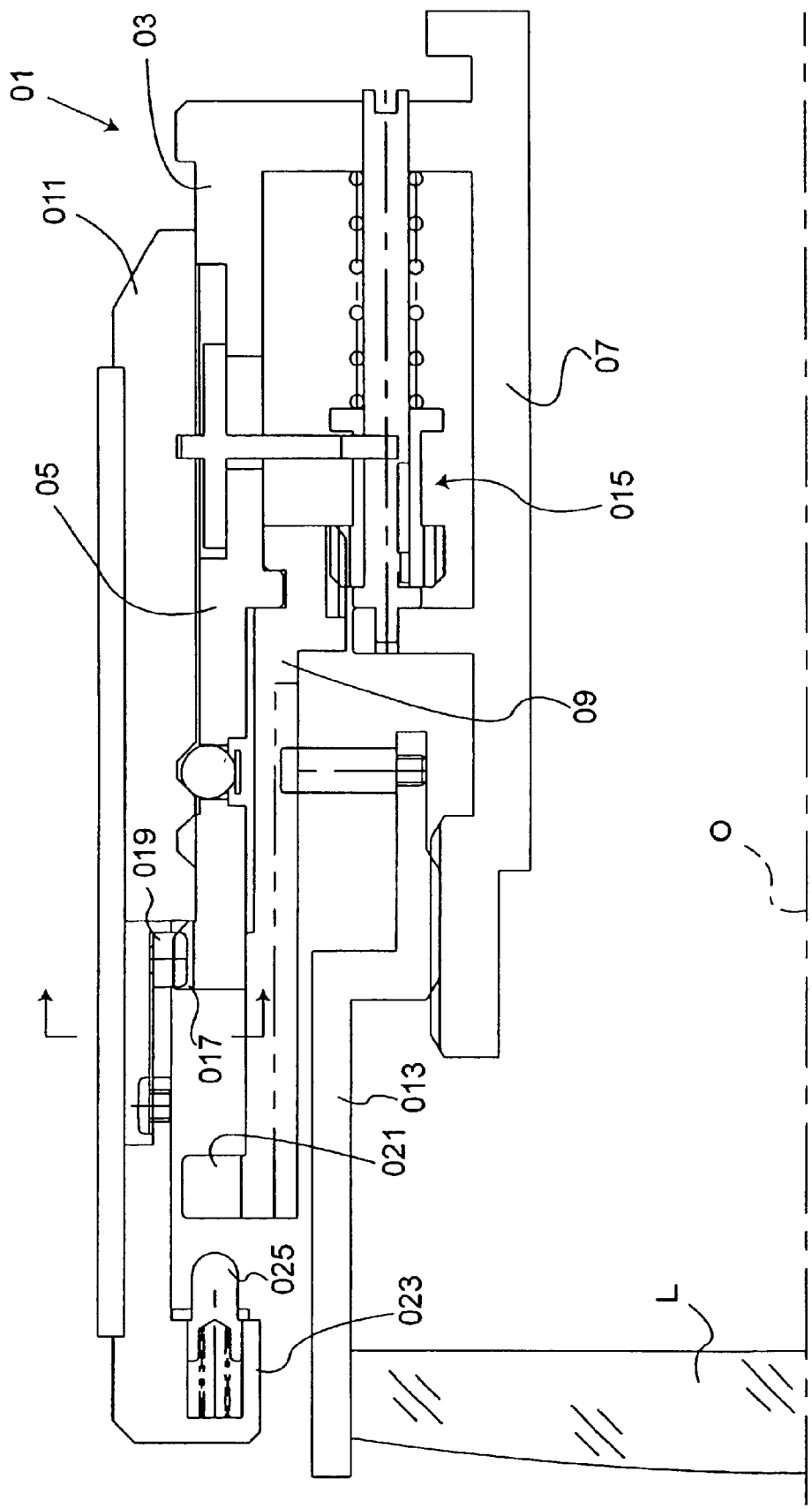
FIG. 8 is a cross sectional view of a conventional lens barrel, showing an upper half of the lens barrel from the optical axis when an AF/MF switching ring is in the AF position.
Figure 9:
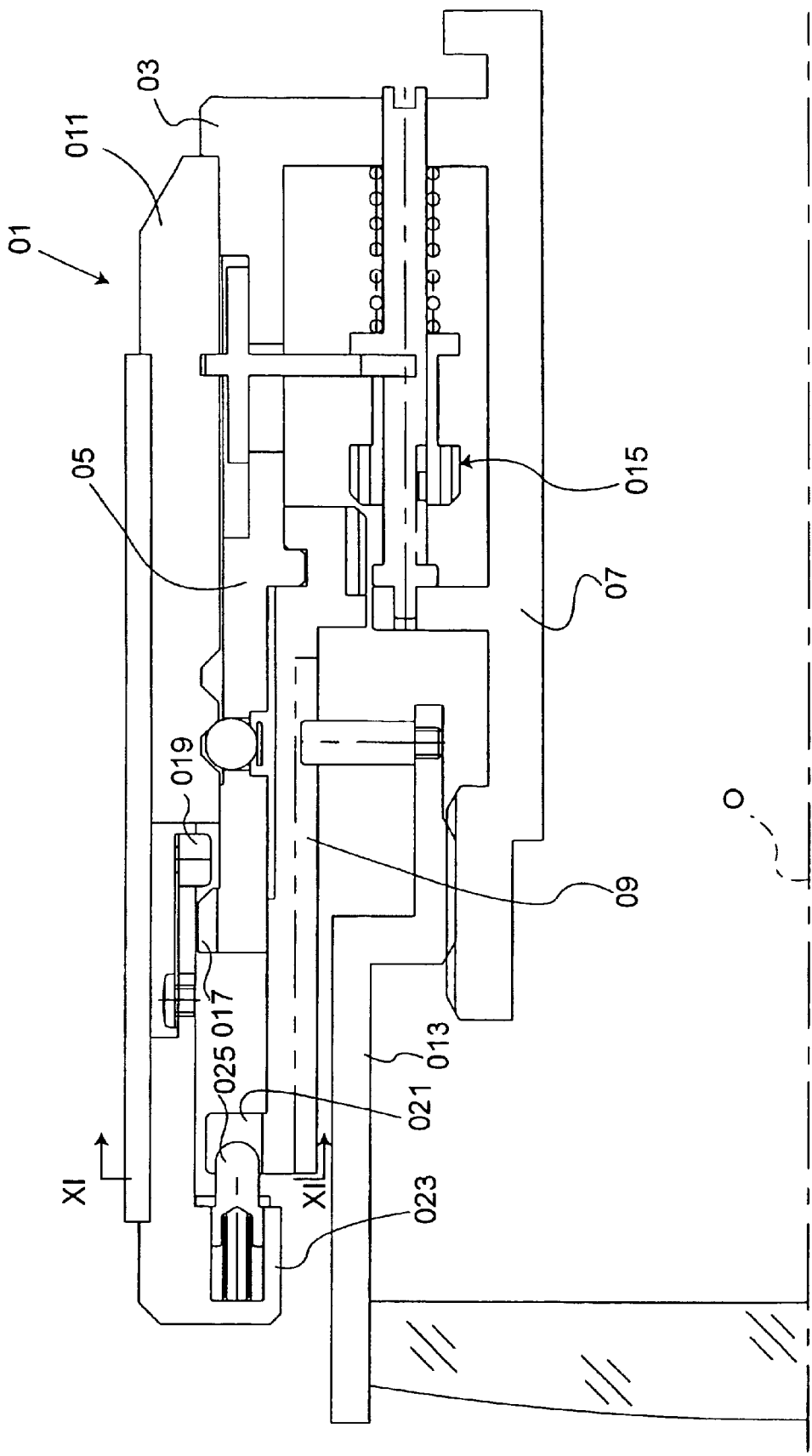
FIG. 9 is a view similar to that of FIG. 8 and shows the conventional lens barrel when the AF/MF switching ring is in the MF position.
Figure 10:
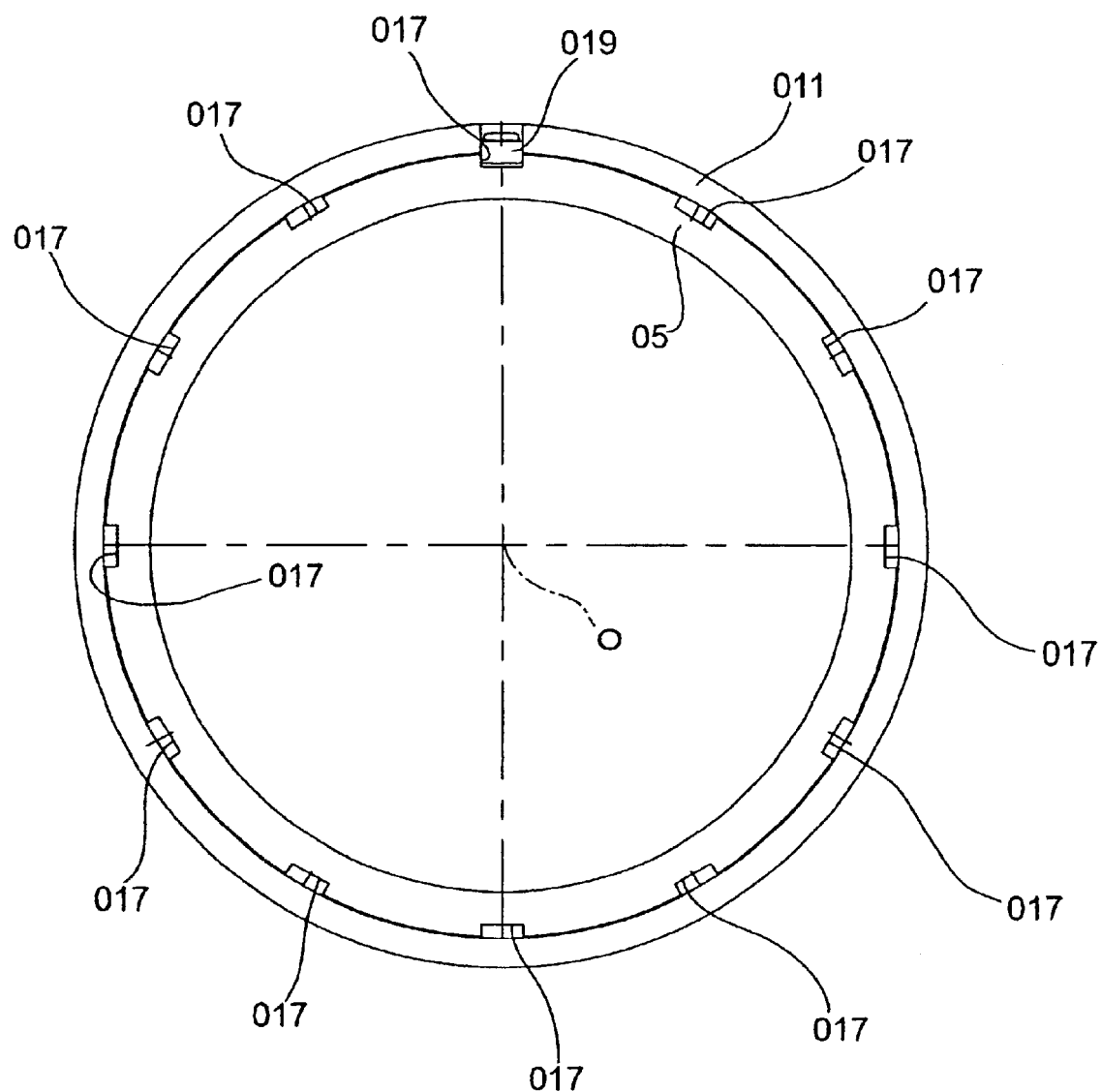
FIG. 10 is a cross sectional view taken along X-X line shown in FIG. 8.
Figure 11:
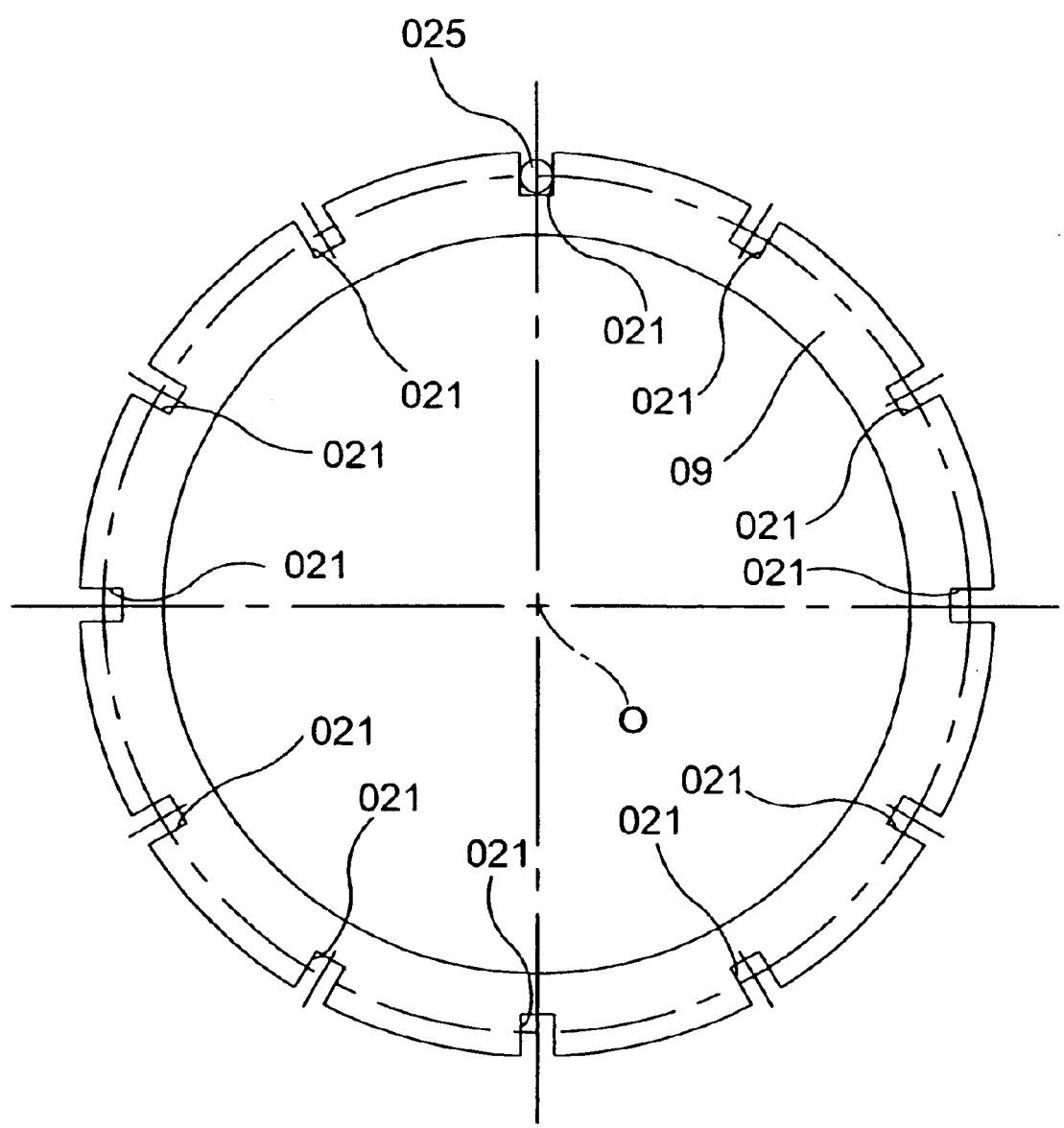
FIG. 11 is a cross sectional view taken along XI-XI line shown in FIG. 9.

As clearly shown in FIGS. 6 and 7, the large-diameter ring portion 5 is provided with a leaf-spring insertion slot 19 which extends in a circumferential direction of the large-diameter ring portion 5. The leaf-spring insertion slot 19 is formed as a through slot at a position on the large-diameter ring portion 5 to face an inner peripheral surface of the AF/MF switching ring 17. The leaf-spring insertion slot 19 includes a spring-deformation allowing portion 21 which radially extends through the large-diameter ring portion 5 to be elongated in a circumferential direction of the large-diameter ring portion 5, and a pair of stepped portions 23 which are positioned at opposite ends of the spring-deformation allowing portion 21 in the circumferential direction of the large-diameter ring portion 5. A pair of opposed recesses 25 are formed on opposed surfaces of the large-diameter ring portion 5 in the spring-deformation allowing portion 21 at the center thereof in a direction of elongation of the spring-deformation allowing portion 21 (the horizontal direction as viewed in FIGS. 6 and 7) to receive a stop ball B in between the pair of opposed recesses 25. Accordingly, the amount of depression of each recess 25 is determined in association with the diameter of the stop ball B.

A leaf spring 27 is inserted (simply dropped) into the leaf-spring insertion slot 19 and positioned therein so that the opposite ends of the leaf spring 27 lie on the pair of stepped portions 23, respectively. A central portion of the leaf spring 27 is positioned in the spring-deformation allowing portion 21 to support the stop ball B fitted in between the pair of opposed recesses 25. The width of the leaf spring 27, which substantially corresponds to the width of the leaf-spring insertion slot 19, is smaller than the diameter of the stop ball B. The front circumferential annular groove 17a, the rear circumferential annular groove 17b, the leaf-spring insertion slot 19, the leaf spring 27 and the stop ball B are fundamental elements of a click stop mechanism for determining an MF position (FIG. 1) and an AF position (FIG. 3) of the AF/MF switching ring 17.

As shown in FIGS. 1 through 3 and 7, the leaf spring 27 is resiliently deformed radially inwards, toward the optical axis O. The resiliency of the leaf spring 27 when it is deformed as shown in FIGS. 1 through 3 and 7 biases the stop ball B radially outwards, in a direction away from the optical axis O, to be selectively engaged in the front circumferential annular groove 17a and the rear circumferential annular groove 17b. The AF/MF switching ring 17 is held in the AF position (the position of the AF/MF switching ring 17 shown in FIG. 3) when the stop ball B is engaged in the rear circumferential annular groove 17b, and the AF/MF switching ring 17 is held in the MF position (the position of the AF/MF switching ring 17 shown in FIG. 1) when the stop ball B is engaged in the front circumferential annular groove 17a.

The AF/MF switching ring 17 is provided, on an inner peripheral surface thereof in the vicinity of the rear end of the AF/MF switching ring 17, with an engaging recess 17c. The lens barrel 1 is provided therein with a coupling member 29 which extends radially between the gear cylinder 15 and the AF/MF switching ring 17. A radially outer end of the coupling member 29 is engaged in the engaging recess 17c of the AF/MF switching ring 17 so that the coupling member 29 moves together with the AF/MF switching ring 17 in the optical axis direction. The coupling member 29 is provided with a slidable leaf 29a which extends in the optical axis direction. An axial guide groove 5b is formed on an outer peripheral surface of the large-diameter ring portion 5 in the vicinity of the rear end thereof and is elongated in the optical axis direction, and the slidable leaf 29a is engaged in the axial guide groove 5b to be slidable on the large-diameter ring portion 5 in the axial guide groove 5b thereof. The large-diameter ring portion 5 is provided in the axial guide groove 5b with a radially through slot 5c. The coupling member 29 extends through the large-diameter ring portion 5 through the radially through slot 5c so that an engaging portion 29b formed at a radially inner end of the coupling member 29 is engaged with the gear cylinder 15 between the gear portion 15b and the flange 15c. The flange 15c prevents the engaging portion 29b from being disengaged from the gear cylinder 15 by the engagement of the flange 15c with the engaging portion 29b.

Figure 2:
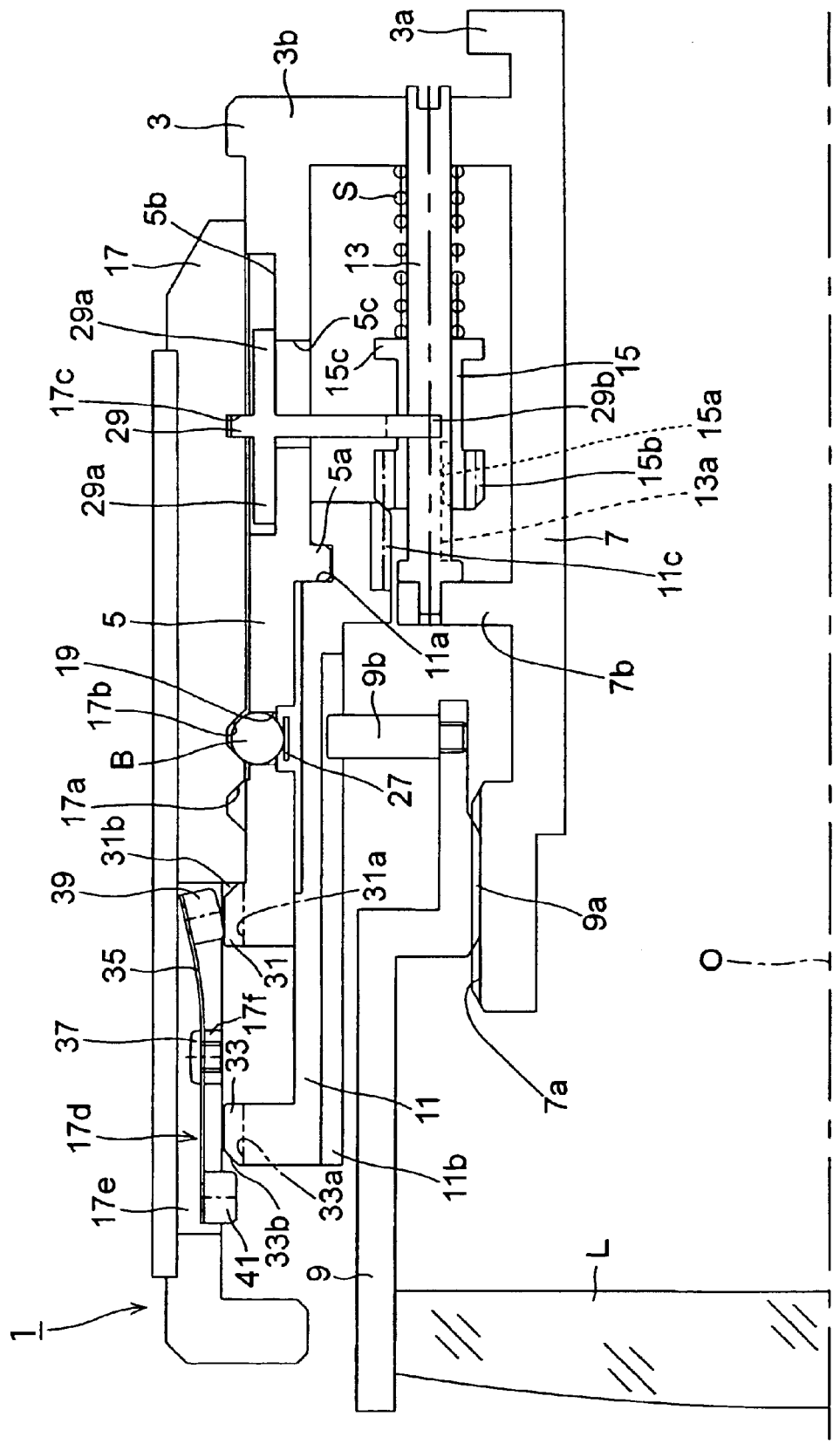
FIG. 2 is a view similar to that of FIG. 1 and shows the lens barrel in a state immediately after the AF/MF switching ring is moved from the MF position to the AF position.
Figure 3:
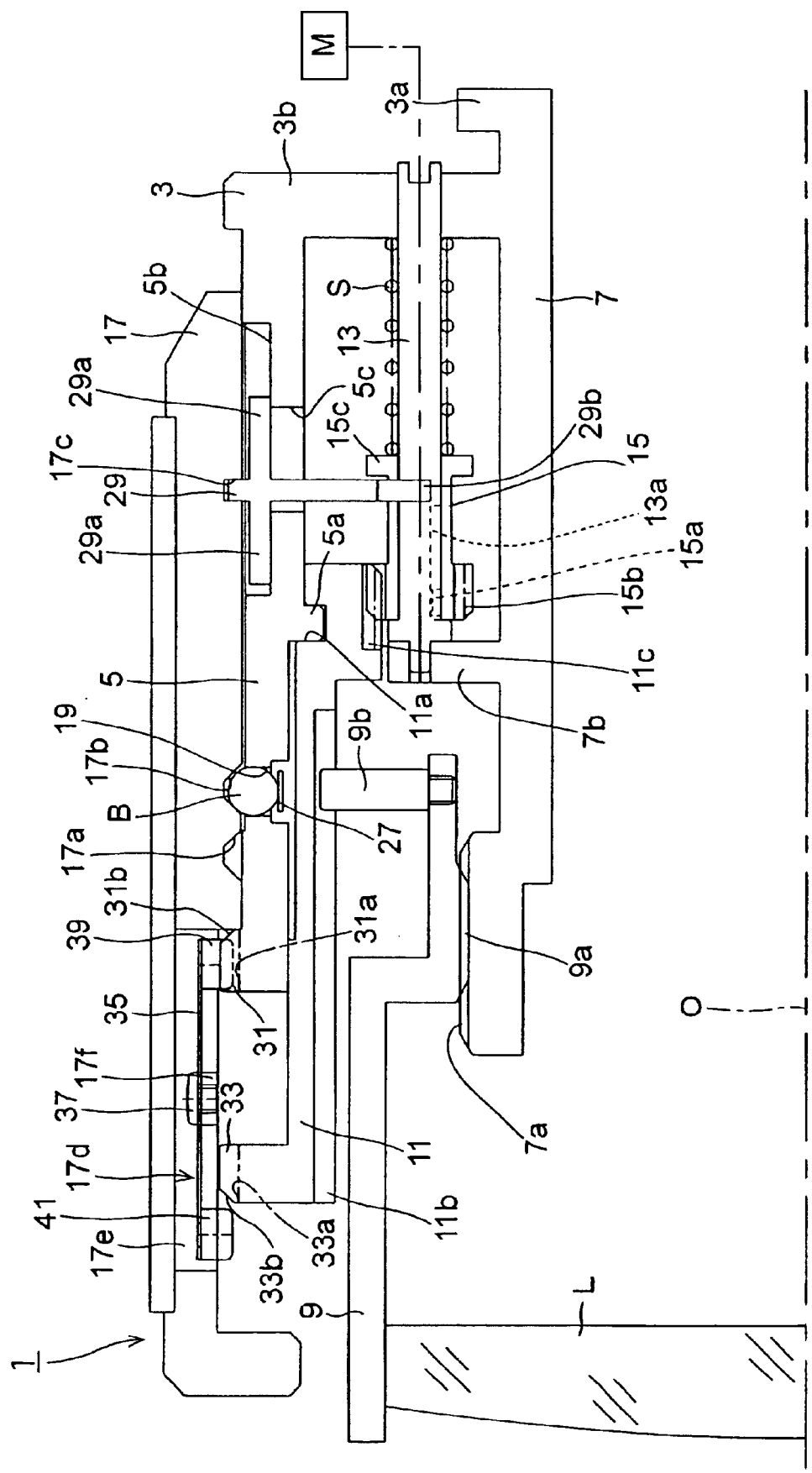
FIG. 3 is a view similar to that of FIG. 2 and shows the lens barrel in a state when the AF/MF switching ring is in the AF position, in which an AF engaging member is engaged in one of a plurality of stop grooves.
Figure 5:
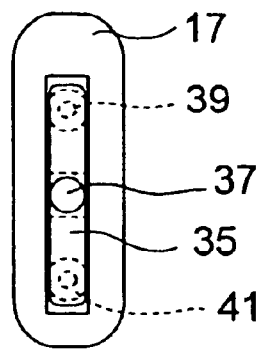
FIG. 5 is a plan view of a fundamental portion of the AF/MF switching ring.
Figure 4:
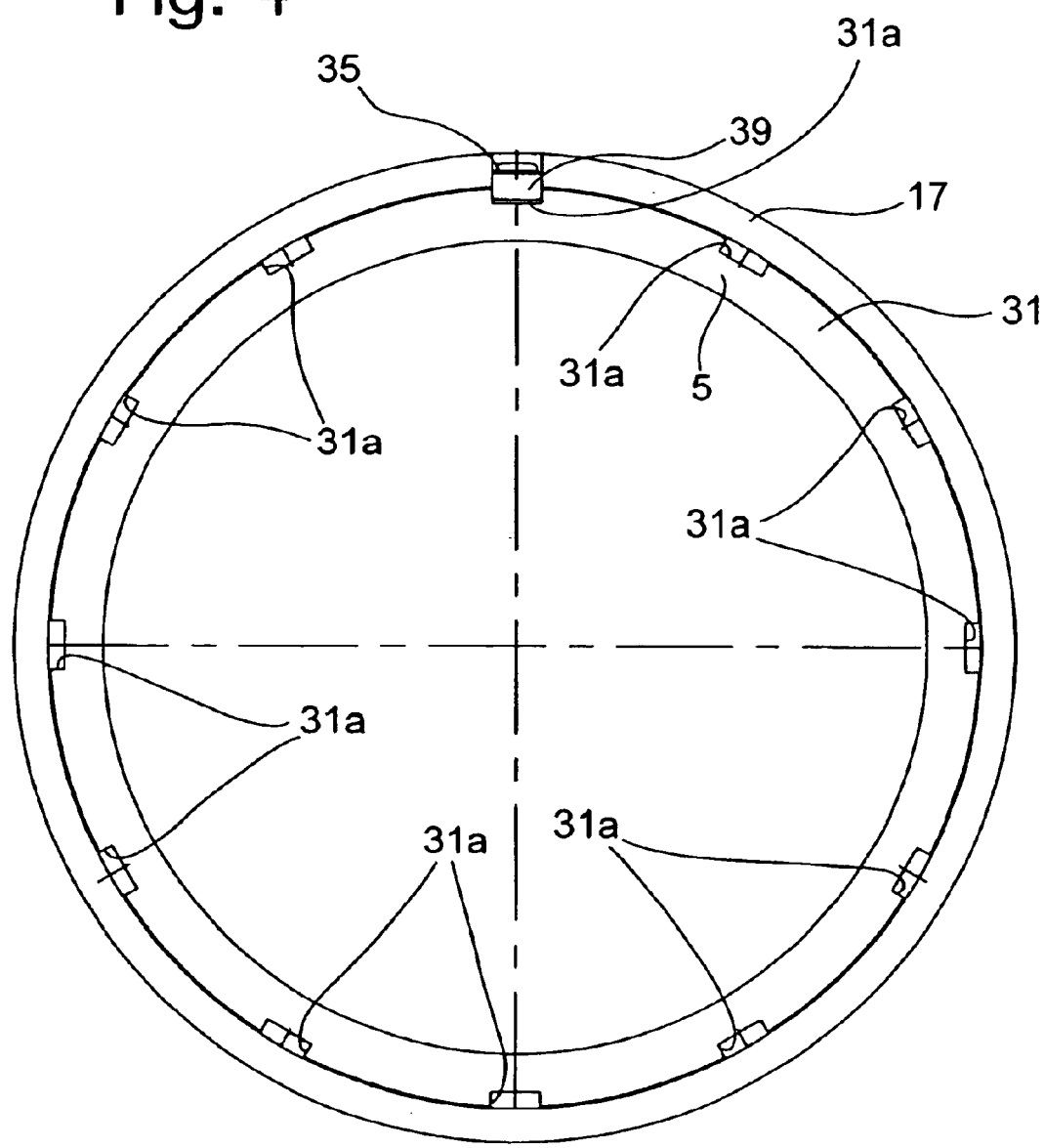
FIG. 4 is a transverse cross sectional view, seen from the front thereof, of the lens barrel in a state shown in FIG. 3, with certain parts omitted.

The large-diameter ring portion 5 is provided at a front end thereof with a rear outer flange 31. The large-diameter ring portion 5 is provided, on an outer peripheral surface of the rear outer flange 31 that faces an inner peripheral surface of the AF/MF switching ring 17, with a plurality of stop grooves 31a which are arranged at equi-angular intervals about the optical axis O. The distance adjustment ring 11 is provided at a front end thereof with a front outer flange 33. The distance adjustment ring 11 is provided with a plurality of engaging grooves 33a, on an outer peripheral surface of the front outer flange 33 that faces an inner peripheral surface of the AF/MF switching ring 17, which are arranged at equi-angular intervals about the optical axis O. As shown in FIGS. 1 through 3, the rear end of the outer peripheral surface of the rear outer flange 31 is formed as a rear beveled surface 31b which extends fully around the optical axis O, while the front end of the outer peripheral surface of the front outer flange 33 is formed as a front beveled surface 33b which extends fully around the optical axis O. The rear ends of the plurality of stop grooves 31a are open on the rear beveled surface 31b while the front ends of the plurality of engaging grooves 33a are open on the front beveled surface 33b.

The AF/MF switching ring 17 is provided, on an inner peripheral surface thereof in the vicinity of the front end of the AF/MF switching ring 17, with a recess 17d which is elongated in the optical axis direction. The AF/MF switching ring 17 is provided in the recess 17d with a support member 17f which extends between opposite surfaces 17e (only one of them appears in FIGS. 1 through 3) in the recess 17d in a circumferential direction of the AF/MF switching ring 17. A leaf spring 35 is positioned in the recess 17d, and a central portion of the leaf spring 35 is fixed to the support member 17f by a set screw 37 so that the direction of the length of the leaf spring 35 is parallel to the optical axis O. An AF engaging member (engaging portion) 39 is fixed to a rear end of an inward surface of the leaf spring 35 which faces the distance adjustment ring 11, while an MF engaging member (engaging portion) 41 is fixed to a front end of the inward surface of the leaf spring 35. The AF engaging member 39 is fixed to the leaf spring 35 so that the position of the AF engaging member 39 corresponds to the position of the rear outer flange 31 in the optical axis direction when the AF/MF switching ring 17 is in the AF position, and the MF engaging member 41 is fixed to the leaf spring 35 so that the position of the MF engaging member 41 corresponds to the position of the front outer flange 33 in the optical axis direction when the AF/MF switching ring 17 is in the MF position. Namely, the AF engaging member 39 is fixed to the leaf spring 35 so that when the AF/MF switching ring 17 is in the AF position and the AF engaging member 39 is aligned with one of the plurality of stop grooves 31a in the circumferential direction, the AF engaging member 39 engages with the stop groove 31a. Likewise, the MF engaging member 41 is fixed to the leaf spring 35 so that when the AF/MF switching ring 17 is in the MF position and, the MF engaging member 41 is aligned with one of the plurality of engaging grooves 33a in the circumferential direction, the MF engaging member 41 engages with the engaging groove 33a.

Operations of the lens barrel 1 which has the above described structure will be hereinafter discussed. When the AF/MF switching ring 17 is in the MF position (FIG. 1), the AF/MF switching ring 17 is held in the MF position due to the stop ball B being engaged in the front circumferential annular groove 17a. At this time, the gear portion 15b of the gear cylinder 15 and the circumferential gear portion 11c of the distance adjustment ring 11 are disengaged from each other because the engaging portion 29b of the coupling member 29 presses the flange 15c of the gear cylinder 15 rearward which is biased forward by the compression coil spring S. Accordingly, rotation of the rotary shaft 13, which is driven by the AF motor (not shown) provided in the associated camera body, is not transferred to the distance adjustment ring 11 when the AF/MF switching ring 17 is in the MF position. Consequently, an autofocusing operation cannot be performed when the AF/MF switching ring 17 is in the MF position.

In addition, when the AF/MF switching ring 17 is in the MF position, rotating the AF/MF switching ring 17 about the optical axis O causes the distance adjustment ring 11 to rotate about the optical axis O due to engagement of the MF engaging member 41 with one of the plurality of engaging grooves 33a. This rotation of the distance adjustment ring 11 is transferred to the focusing ring 9 via the engagement of the set of drive power transfer pins 9b with the set of axial grooves 11b, thus moving the focusing ring 9 along the optical axis O while rotating the same about the optical axis O. Therefore, a manual focusing operation can be carried out by rotation of the AF/MF switching ring 17 when the AF/MF switching ring 17 is in the MF position.

Operations of the lens barrel 1 when the AF/MF switching ring 17 is moved from the MF position to the AF position will be hereinafter discussed. When the AF/MF switching ring 17 is moved from the MF position to the AF position, the MF engaging member 41 moves forward from the front outer flange 33 to be disengaged from one of the plurality of engaging grooves 33a through the front end opening of the one engaging groove 33a as shown in FIG. 2. At the same time, the AF engaging member 39 moves forward to be engaged in one of the plurality of stop grooves 31a through the rear end opening of the one stop groove 31a if the AF engaging member 39 is aligned with one of the stop grooves 31a in the optical axis direction. If the AF engaging member 39 is not aligned with one of the stop grooves 31a, the leaf spring 35 is resiliently deformed so that the AF engaging member 39 runs on the outer peripheral surface of the rear outer flange 31 over the rear beveled surface 31b (see FIG. 2). In this state, a slight rotation of the AF/MF switching ring 17 causes the AF engaging member 39 align with one of the plurality of stop grooves 31a in the circumferential direction, thus causing the AF engaging member 39 to engage in one of the plurality of stop grooves 31a by the resiliency of the leaf spring 35 (see FIG. 3).

When moved from the MF position to the AF position, the AF/MF switching ring 17 is held in the AF position by the engaging of the stop ball B with the rear circumferential annular groove 17b.

Such a movement of the AF/MF switching ring 17 from the MF position to the AF position causes the engaging portion 29b of the coupling member 29 to be disengaged from the flange 15c of the gear cylinder 15. This disengagement of the engaging portion 29b from the flange 15c causes the gear portion 15b of the gear cylinder 15 to be engaged with the gear portion 11c of the distance adjustment ring 11 because the gear cylinder 15 is biased forward by the compression coil spring S. In this state where the gear portion 15b is engaged with the gear portion 11c, rotation of the AF motor (not shown) provided in the associated camera body, is transferred to the distance adjustment ring 11 to rotate the distance adjustment ring 11 via the rotary shaft 13 and the gear cylinder 15 upon rotation of the AF motor. This rotation of the distance adjustment ring 11 is transferred to the focusing ring 9 via the engagement of the set of drive power transfer pins 9b with the set of axial grooves 11b, thus moving the focusing ring 9 along the optical axis O while rotating the same about the optical axis O to perform an autofocusing operation.

When the AF/MF switching ring 17 is moved from the AF position to the MF position, the AF engaging member 39 moves rearward from the rear outer flange 31 to be disengaged from one of the plurality of stop grooves 31a through the rear end opening of the one stop groove 31a. At the same time, the MF engaging member 41 moves rearward to be engaged in one of the plurality of engaging grooves 33a through the front end opening of the engaging groove 33a if the MF engaging member 41 is aligned with the engaging groove 33a in the optical axis direction. If the MF engaging member 41 is not aligned with the engaging groove 33a, the leaf spring 35 is resiliently deformed so that the MF engaging member 41 runs on the outer peripheral surface of the front outer flange 33 over the front beveled surface 33b. In this state, a slight rotation of the AF/MF switching ring 17 causes the MF engaging member 41 align with one of the plurality of engaging grooves 33a in the circumferential direction, thus causing the MF engaging member 41 to engage in one of the plurality of engaging grooves 33a by the resiliency of the leaf spring 35.

According to the above described embodiment of the lens barrel 1, the cost of production and the cost of assembly of the lens barrel are less than in the case where the AF engaging member 39 and the MF engaging member 41 are fixed independently to the AF/MF switching ring 17, due to the AF engaging member 39 and the MF engaging member 41, which are respectively engageable in any of the plurality of stop grooves 31a and any of the plurality of engaging grooves 33a, being fixed to the leaf spring 35 by screws (not shown) so as to be integral with the leaf spring 35, and due to this leaf spring 35 being fixed to the AF/MF switching ring 17. In addition, miniaturization of the lens barrel 1 can be achieved.

Note that although in the illustrated embodiment the AF engaging member 39 and the MF engaging member 41 are fixed to the leaf spring 35 with screws, it is alternatively possible to form (mold) the AF engaging member 39 and the MF engaging member 41 with the leaf spring 35 as an integrally formed member out of a compound resin.

Moreover, the AF engaging member 39 and the MF engaging member 41 can be easily engaged in any one of the plurality of stop grooves 31a and any one of the plurality of engaging grooves 33a, respectively, by a slight rotation of the AF/MF switching ring 17 even if the AF engaging member 39 runs on the outer peripheral surface of the rear outer flange 31 or the MF engaging member 41 runs on the outer peripheral surface of the front outer flange 33 when the AF/MF switching ring 17 is moved from the AF position to the MF position or from the MF position to the AF position. This is because the AF engaging member 39 and the MF engaging member 41 are automatically engaged in one of the plurality of stop grooves 31a and one of the plurality of engaging grooves 33a due to the spring force of the leaf spring 35 immediately after the AF engaging member 39 and the MF engaging member 41 become aligned with one of the plurality of stop grooves 31a and one of the plurality of engaging grooves 33a in the circumferential direction, respectively, when the AF/MF switching ring 17 is rotated.

Furthermore, the AF engaging member 39 and the MF engaging member 41 can be easily engaged in any one of the plurality of stop grooves 31a and any one of the plurality of engaging grooves 33a, respectively, by a slight rotation of the AF/MF switching ring 17 since the plurality of stop grooves 31a are arranged on the rear outer flange 31 at equi-angular intervals in a circumferential direction of the rear outer flange 31 while the plurality of engaging grooves 33a are arranged on the front outer flange 33 at equi-angular intervals in a circumferential direction of the front outer flange 33.

As can be understood from the foregoing, a lens barrel having a switching mechanism between an automatic focusing mode and a manual focusing mode is achieved, wherein the cost of production and the cost of assembly of the lens barrel can be reduced and the lens barrel can be miniaturized.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A switching mechanism of a lens barrel for switching between an automatic focusing mode and a manual focusing mode, said switching mechanism comprising:

a stationary barrel having at least one stop groove;

a lens holding ring, positioned concentrically with said stationary barrel, said lens holding ring holding at least one lens group;

a distance adjustment ring which is positioned concentrically with said stationary barrel, immovable along an optical axis relative to said stationary barrel, and rotatable about said optical axis relative to said stationary barrel, wherein a rotation of said distance adjustment ring causes said lens holding ring to move along said optical axis, and wherein said distance adjustment ring includes at least one engaging groove;

an AF/MF switching ring which is positioned concentrically with said stationary barrel, movable along said optical axis relative to said stationary barrel, and rotatable about said optical axis relative to said stationary barrel, wherein movement of said AF/MF switching ring relative to said stationary barrel between an AF position and an MF position switches between said automatic focusing mode and said manual focusing mode, respectively; and an engaging member provided on said AF/MF switching ring, said engaging member being selectively engaged with said stop groove and said engaging groove, wherein said AF/MF switching ring is prevented from rotating relative to said stationary barrel by engagement of said engaging member with said stop groove while a driving force is transferred from a power source to said distance adjustment ring to move said lens holding ring along said optical axis when said AF/MF switching ring is in said AF position, and wherein a rotation of said AF/MF switching ring is transferred to said distance adjustment ring to move said lens holding ring along said optical axis via engagement of said engaging member with said engaging groove while said driving force is prevented from being transferred from said power source to said distance adjustment ring when said AF/MF switching ring is in said MF position.

2. The switching mechanism according to claim 1, wherein said engaging member comprises:

a first engaging portion and a second engaging portion which are fixed at opposite ends of a leaf spring in said optical axis direction to be engageable with said stop groove and said engaging groove, respectively, said leaf spring being elongated in said optical axis direction and a central portion thereof being fixed to said AF/MF switching ring, wherein said leaf spring is resiliently deformed to move said first engaging portion to a non-engaging position thereof, wherein said first engaging portion is disengaged from said stop groove, when said AF/MF switching ring moves from said MF position to said AF position in the case where said first engaging portion is not aligned with said stop groove in the circumferential direction thereof, and wherein said leaf spring is resiliently deformed to move said second engaging portion to a non-engaging position thereof wherein said second engaging portion is disengaged from said engaging groove when said AF/MF switching ring moves from said AF position to said MF position in the case where said second engaging portion is not aligned with said engaging groove in said circumferential direction.

3. A switching mechanism of a lens barrel for switching between an automatic focusing mode and a manual focusing mode, said switching mechanism comprising:

a stationary barrel having at least one stop groove;

a lens holding ring holding at least one lens group which functions as a focusing lens, said lens holding ring being movable in an optical axis direction;

a distance adjustment ring being relatively rotatable with respect to said stationary barrel so that a rotation of said distance adjustment ring causes said lens holding ring to move along the optical axis, said distance adjustment ring being provided with at least one engaging groove;

an AF/MF switching ring being movable between an AF position and an MF position along said optical axis and rotatable relative to said stationary barrel;

an AF driving power mechanism which rotates the distance adjustment ring when the AF/MF switching ring is positioned at the AF position in accordance with object distance information; and a first engaging portion and a second engaging portion which are fixed at opposite ends of a leaf spring in said optical axis direction to be engageable with said stop groove and said engaging groove, respectively, said leaf spring being elongated in said optical axis direction and a central portion thereof being fixed to said AF/MF switching ring, wherein said leaf spring is resiliently deformed to move said first engaging portion to a non-engaging position thereof, wherein said first engaging portion is disengaged from said stop groove, when said AF/MF switching ring moves from said MF position to said AF position in the case where said first engaging portion is not aligned with said stop groove in the circumferential direction thereof, and wherein said leaf spring is resiliently deformed to move said second engaging portion to a non-engaging position thereof wherein said second engaging portion is disengaged from said engaging groove when said AF/MF switching ring moves from said AF position to said MF position in the case where said second engaging portion is not aligned with said engaging groove in said circumferential direction.

4. The switching mechanism according to claim 1, wherein said stop groove of said stationary barrel comprises a plurality of stop grooves arranged in a circumferential direction of said stationary barrel.

5. The switching mechanism according to claim 1, wherein said engaging groove of said distance adjustment ring comprises a plurality of stop grooves arranged in a circumferential direction of said stationary barrel.

6. The switching mechanism according to claim 4, wherein said plurality of stop grooves are arranged at equi-angular intervals.

7. The switching mechanism according to claim 5, wherein said plurality of engaging grooves are arranged at equi-angular intervals.

8. The switching mechanism according to claim 1, wherein said AF/MF switching ring is fitted on said stationary barrel to be manually moved between said AF position and said MF position, and wherein said AF/MF switching ring includes a recess on an inner peripheral surface thereof, said engaging member being positioned in said recess.

9. The switching mechanism according to claim 2, wherein said leaf spring is resiliently deformed so that said first engaging portion moves radially outwards when said AF/MF switching ring moves from said MF position to said AF position in the case where said first engaging portion is not aligned with said stop groove in said circumferential direction, and wherein said leaf spring is resiliently deformed so that said second engaging portion moves radially outwards when said AF/MF switching ring moves from said AF position to said MF position if said second engaging portion is not aligned with said engaging groove in said circumferential direction.

10. A switching mechanism of a lens barrel for switching between an automatic focusing mode and a manual focusing mode, said switching mechanism comprising:

a stationary ring having a first plurality of engaging grooves arranged at equi-angular intervals about an optical axis;

an AF/MF switching ring fitted on said stationary ring to be manually movable along said optical axis relative to said stationary ring between an AF position and an MF position to switch between said automatic focusing mode and said manual focusing mode, respectively;

a rotatable ring fitted in said stationary ring to be rotatable about said optical axis without moving along said optical axis relative to said stationary ring, said rotatable ring having a second plurality of engaging grooves arranged at equi-angular intervals about an optical axis; and an engaging member fixed to opposite ends of a leaf spring in the optical axis direction, said leaf spring fixed to said AF/MF switching ring, wherein said engaging member includes a first engaging portion and a second engaging portion which are engageable in any one of said first plurality of engaging grooves and any one of said second plurality of engaging grooves, respectively, wherein said first engaging portion of said engaging member is engaged in one of said first plurality of engaging grooves when said AF/MF switching ring moves from said MF position to said AF position in the case where said first engaging portion is aligned with said one first engaging groove in the circumferential direction thereof, wherein said second engaging portion of said engaging member is engaged in one of said second plurality of engaging grooves when said AF/MF switching ring moves from said AF position to said MF position in the case where said second engaging portion is aligned with said one second engaging groove in the circumferential direction thereof, and wherein said leaf spring is resiliently deformed so that said first engaging portion moves radially outwards when said AF/MF switching ring moves from said MF position to said AF position in the case where said first engaging portion is not aligned with said one first engaging groove in the circumferential direction, and so that said second engaging portion moves radially outwards when said AF/MF switching ring moves from said AF position to said MF position in the case where said second engaging portion is not aligned with said one second engaging groove in said circumferential direction thereof.

11. The switching mechanism according to claim 10, wherein said rotatable ring is driven to rotate by an AF motor provided in a camera body to which said lens barrel is mounted when said AF/MF switching ring is in said AF position, and wherein a focusing lens group moves along said optical axis by a rotation of said AF/MF switching ring via said rotatable ring when said AF/MF switching ring is in said MF position.

* * * * *